(12) United States Patent
Bekiares et al.

(10) Patent No.: US 8,531,993 B2
(45) Date of Patent: Sep. 10, 2013

(54) FLOOR CONTROL IN A COMMUNICATION SYSTEM

(75) Inventors: Tyrone D. Bekiares, Chicago, IL (US); Bradley M. Hiben, Glen Ellyn, IL (US); Bob LoGalbo, Rolling Meadows, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 0 days.

(21) Appl. No.: 12/210,644

(22) Filed: Sep. 15, 2008

(65) Prior Publication Data

US 2009/0109994 A1    Apr. 30, 2009

Related U.S. Application Data

(63) Continuation of application No. 11/926,686, filed on Oct. 29, 2007, now abandoned.

(51) Int. Cl.
*H04L 12/16* (2006.01)
*H04Q 11/00* (2006.01)

(52) U.S. Cl.
USPC ............................. 370/260; 370/259; 370/261

(58) Field of Classification Search
USPC ................. 709/708, 709, 220, 221, 222, 227, 709/228, 230, 231; 370/229, 230.1, 231, 370/254, 259, 260, 261, 262, 310, 312, 346, 370/464, 535
See application file for complete search history.

(56) References Cited

U.S. PATENT DOCUMENTS

| | | | |
|---|---|---|---|
| 6,212,562 B1 | 4/2001 | Huang | |
| 6,294,095 B1 | 9/2001 | Lewis | |
| 6,623,633 B2 | 9/2003 | McDermott et al. | |
| 6,798,755 B2 | 9/2004 | Lillie et al. | |
| 6,872,029 B2 | 3/2005 | Allard et al. | |
| 7,670,483 B2 | 3/2010 | Ringenbach et al. | |
| 7,697,949 B2 | 4/2010 | Yoshida et al. | |
| 2004/0010549 A1 | 1/2004 | Matus et al. | |
| 2006/0059266 A1 | 3/2006 | Ludwig et al. | |
| 2006/0080407 A1 | 4/2006 | Rengaraju | |
| 2006/0154681 A1 | 7/2006 | Park et al. | |
| 2006/0178160 A1 | 8/2006 | Hans et al. | |
| 2007/0019595 A1 | 1/2007 | Huh et al. | |

(Continued)

FOREIGN PATENT DOCUMENTS

WO    0057656    9/2000

OTHER PUBLICATIONS

Camarillo, "RFC 4582 The Binary Floor Control Protocol", IETF, Nov. 2006.*

(Continued)

*Primary Examiner* — Kwang B Yao
*Assistant Examiner* — Adam Duda
(74) *Attorney, Agent, or Firm* — Lalita W. Pace; Valerie M. Davis; Kenneth A. Haas

(57) ABSTRACT

A method (400) of implementing floor control in a communications system (100). The method can include receiving a random symbol from each of a plurality of communication devices (104, 106, 108, 110, 112) or network nodes (204, 206, 208, 210, 212). From the plurality of random symbols, a random symbol that satisfies a criteria can be identified. Floor ownership can be granted to a selected one of the communication devices associated with the identified random symbol or from which the identified random symbol was received.

15 Claims, 4 Drawing Sheets

(56) References Cited

U.S. PATENT DOCUMENTS

2007/0121872 A1 5/2007 Hans et al.
2008/0102869 A1 5/2008 Shaffer et al.
2008/0319783 A1 12/2008 Yao et al.

OTHER PUBLICATIONS

Camarillo2, "I-D The Binary Floor Control Protocol", IETF, Nov. 29, 2005.*
Motorola1: "Section 2A—Motobridge IP System Overview", Commonwealth of Virginia, Section 2A, all pages, Mar. 21, 2007.*
Motorola2: "Section 1—Executive Summary", Commonwealth of Virginia, Section 1, all pages, Feb. 14, 2007.*
Garcia-Luna-Aceves, J J et al.: "Floor Control Alternatives for Distributed Videoconferencing over IP Networks", Collaborative Computing: Networking, Applications and Worksharing, 200 5 International Conference on San Jose, CA, USA Dec. 19-21, 2005, Piscataway, NJ, USA, IEEE, Dec. 19, 2005, pp. 1-10.
Banik, S. M. et al.: "Distributed Floor Control Protocols for Computer Collaborative Applications on Overlay Networks", Collaborative Computing: Networking, Applications and Worksharing, 200 5 International Conference on San Jose, CA, USA Dec. 19-21, 2005, Piscataway, NJ, USA, IEEE, Dec. 19, 2004, pp. 1-10.
Camarillo et al.: "The Binary Floor Control Protocol (BFCP); rfc4582.txt", Internet Engineering Task Force, Nov. 1, 2006, pp. 1-65.
Koskelainen et al.: "Requirements for Floor Control Protocols; rfc4376.txt", Internet Engineering Task Force, Feb. 1, 2006, pp. 1-14.
Poppe, Fabrice, "PCT International Search Report and Written Opinion,", WIPO, ISA/EP, European Patent Office, Rijswijk, Feb. 12, 2009.
USPTO Office Action, Non-Final Rejection, U.S. Appl. No. 11/926,686, dated Jan. 21, 2010, 25 pages.
PCT/US2008/083285, PCT Search Report and Written Opinion, mailed Mar. 31, 2009, 14 pages.
Motorola, Motobridge IP System Overview, Stars Contract Modification #18, Commonwealth of Virginia, 10 pages, Mar. 21, 2007.
Jiun-Ren Lin et al, iPTT: Peer to Peer Push-to-Talk for VoIP, Nov. 20, 2006, 26 pages.
Non-Final Rejection mailed Aug. 29, 2011 in counterpart U.S. Appl. No. 13/205,066, James A. Ringenbach, Filed Aug. 8, 2011.
International Preliminary Report on Patentability and Written Opinion for counterpart International Patent Application No. PCT/US2008/078260 mailed May 14, 2010, May 19, 2013.
International Search Report and Written Opinion for counterpart International Patent Application No. PCT/US2008/078260 mailed Feb. 19, 2009, May 19, 2013.
Notice of Allowance mailed Jun. 6, 2011 in related U.S. Appl. No. 11/946,221, Alain D. Abbate, filed Nov. 28, 2007.
Notice of Allowance mailed Feb. 22, 2011 in related U.S. Appl. No. 11/946,221, Alain D. Abbate, filed Nov. 28, 2007.
Non-Final Office Action mailed Sep. 15, 2010 in related U.S. Appl. No. 11/946,221, Alain D. Abbate, filed Nov. 28, 2007.
Office Action mailed Jun. 27, 2011 in counterpart Australian Patent Application No. 2008319158.
English Translation of Office Action mailed Feb. 29, 2012 in counterpart Chinese Patent Application No. 200880113884.4.
English Translation of Office Action mailed Oct. 26, 2012 in counterpart Chinese Patent Application No. 200880113884.4.
Office Action mailed Feb. 7, 2013 in counterpart European Patent Application No. 08845325.3.
International Preliminary Report on Patentability and Written Opinion for related counterpart International Patent Application No. PCT/US2008/083285 mailed Jun. 10, 2010.

* cited by examiner

FLOOR CONTROL IN A COMMUNICATION SYSTEM

RELATED APPLICATIONS

The present application is related to the following U.S. applications commonly owned with this application by Motorola, Inc.:

Ser. No. 11/926,686, filed Oct. 29, 2007 now abandoned, titled "Floor Control in a Communication System", which is the parent case of the present Continuation application, the entire contents of which being incorporated herein by reference; and Ser. No. 11/946,221, filed Nov. 28, 2007, titled "System and Method for Providing Low Overhead Floor Control in a Distributed Peer-to-Peer Communications Network", the entire contents of which being incorporated herein by reference.

BACKGROUND OF THE INVENTION

1. Field of the Invention

The present invention generally relates to communications systems and, more particularly, to those which support half duplex communications.

2. Background of the Invention

At a given time, a half duplex logical channel in a wide area communications system typically will allow only a single subscriber station to communicate media to other subscriber stations associated with the same half duplex logical channel. The subscriber station that is allowed to communicate is generally referred to as a "floor owner." The process of selecting a floor owner from a plurality of subscriber stations seeking to communicate is generally referred to as "floor control."

Certain wide area communications systems do not provide a centralized floor control mechanism to assign floor ownership for a given half duplex logical channel. In such systems, the subscriber stations signal their requests for floor ownership by transmitting floor requests directly to other subscriber stations associated with the same half duplex logical channel. Such floor requests can be explicit or implicit. An explicit floor request is a floor request that is distinct from media being communicated, whereas an implicit floor request is coupled to the media.

Each of the subscriber stations that receives such a request typically selects a floor owner by selecting the remote subscriber station that transmitted the floor request which it first receives, assuming floor ownership is not currently assigned, of course. In such an arrangement, it is possible for receiving subscriber stations to receive floor requests from multiple subscriber stations attempting to acquire floor ownership at roughly the same time. Moreover, differing signal propagation delays may exist between the plurality of subscriber stations associated with the same half duplex logical channel. As a result, different subscriber stations may grant floor ownership to different transmitting subscriber stations. Such unsynchronized behavior can disrupt communications amongst a group of subscriber stations associated with the same half duplex logical channel, as individual subscriber stations belonging to the group may be reproducing different data streams concurrently.

In communications systems that do provide a centralized request and grant mechanism, a subscriber station typically requests floor ownership by communicating a request for floor control to a centralized controller. Assuming floor ownership is currently available, the first request for floor control received by the controller for a given half duplex logical channel is typically granted. Later requests from other subscriber stations trying to access that same half duplex logical channel will typically be denied until the selected floor owner gives up floor ownership. Use of a centralized controller adds costs to a communications system, however.

SUMMARY OF THE INVENTION

The present invention relates to a method of implementing floor control in a communications system. The method can include receiving a random symbol from each of a plurality of communication devices. From the plurality of random symbols, a random symbol that satisfies a criteria can be identified. Floor ownership can be granted to a selected one of the communication devices from which the identified random symbol was received.

The present invention also relates to a method of implementing floor control in a communications system, which includes receiving a random symbol from each of a plurality of network nodes and, from the plurality of random symbols, identifying a random symbol that satisfies a criteria. The method further can include granting floor ownership to a communication device associated with the identified random symbol.

Another arrangement of the present invention relates to a communication device. The communication device can include a transceiver that receives a random symbol from each of a plurality of other communication devices. The communication device can also include a floor control application that, from the plurality of random symbols, identifies a random symbol that satisfies a criteria. The floor control application can grant floor ownership to a selected one of the other communication devices from which the identified random symbol was received.

The present invention also relates to a network node. The network node can include a network adapter that receives a random symbol from each of a plurality of other network nodes. The network node further can include a floor control application that, from the plurality of random symbols, identifies a random symbol that satisfies a criteria, and grants floor ownership to a communication device associated with the identified random symbol.

BRIEF DESCRIPTION OF THE DRAWINGS

Preferred embodiments of the present invention will be described below in more detail, with reference to the accompanying drawings, in which.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Figure 1:
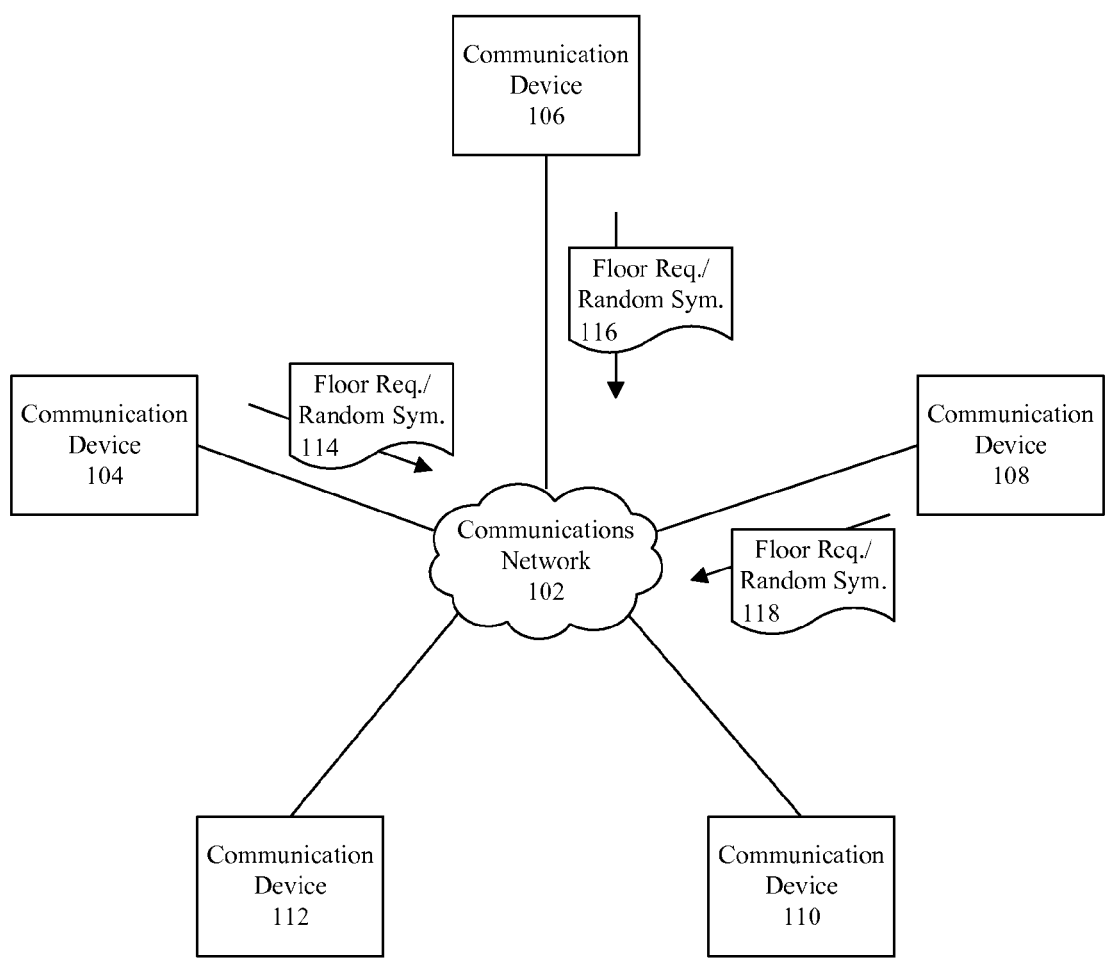
FIG. 1 depicts a communications system that is useful for understanding the present invention.

The present invention relates to a method of granting floor control in a communications system based on randomly generated symbols communicated by, or on behalf of, communication devices for which floor control is requested. FIG. 1 depicts a communications system 100 that is useful for understanding the present invention. In one arrangement, the communications system 100 can be a half-duplex communications system, for instance a dispatch communications system.

The communications system 100 can include a communications network 102, which may comprise any suitable network infrastructure, for example a wide area network (WAN), such as the Internet, the World Wide Web, a cellular communications network, a public switched telephone network (PSTN), and the like. Other examples of suitable network infrastructure may include, but are not limited to, a radio access network (RAN), a local area network (LAN), a metropolitan area network (MAN), a WiFi network, a Mesh network, a public safety network (e.g. Astro, TETRA, HPD, etc.) and/or any other networks or systems over which communication signals can be propagated. In that regard, the communications network 102 can include wired and/or wireless communication links.

The communications network 102 can be configured to communicate data via IEEE 802 wireless communications, for example, 802.11 and 802.16 (WiMAX), 3G, 4G, WPA, WPA2, GSM, TDMA, CDMA, WCDMA, OFDM, direct wireless communication, or any other communications format. Indeed, the communications network 102 can be implemented in accordance with any suitable communications standards, protocols, and/or architectures, or a suitable combination of such standards, protocols, and/or architectures.

The communications system 100 can also include a plurality communication devices 104, 106, 108, 110, 112 which communicate via the communications network 102. The communication devices 104-112 can be, for instance, mobile stations (e.g. mobile telephones, mobile radios, mobile computers, personal digital assistants, or the like), computers, set top boxes, access terminals, subscriber stations, base stations, user equipment, or any other devices suitably configured to communicate via the communications network 102. As such, the communication devices 104-112 can comprise one or more processors/controllers, data storage devices, user interfaces, communication adapters (e.g. transceivers, network adapters, etc.), and/or other suitable components.

The communication devices 104-112 can be associated with one another in any suitable manner. For example, the communication devices 104-112 can share a particular half duplex logical channel for the purposes of group communication, or each can be assigned to communicate over a particular communications system, such as the communications system 100.

During operation, one or more of the communication devices, for instance communication devices 104-108, can communicate a respective floor request 114, 116, 118. As used herein, the term "floor request" means one or more data packets or frames comprising an indicator indicating a request to become a "floor owner." For the purpose of brevity, hereinafter the term "packet" will mean a data packet and/or a frame. A floor request may be explicitly communicated, wherein the floor request is distinct from media being communicated, or it may be implicitly communicated, wherein the floor request is coupled to the media. As used herein, the term "floor owner" means a communication device that is granted the right to communicate a data stream to a target resource. As used herein, a "target resource" is a half duplex logical channel of communications shared amongst one or more communication devices.

Each of the communication devices may, at roughly the same time, communicate their respective floor requests 114, 116, 118 to one or more communication devices associated with a target resource, for instance within micro-seconds, milli-seconds or seconds of each other. When this occurs, the communication device(s) associated with the target resource can grant the floor request of one of the communication devices 104-108, thereby granting such communication device floor ownership.

Assume that each of the communication devices 104-108 seeks to communicate to all other members of a call group that comprises the communication devices 104-112. The communication device 104 can communicate the floor request 114 to each of the communication devices 106-112, the communication device 106 can communicate the floor request 116 to each of the communication devices 104, 108-112, and the communication device 108 can communicate the floor request 118 to each of the communication devices 104-106, 110-112. In this instance, it typically will be advantageous if each of the communication devices 104-112 in the call group selects the same communication device to be the floor owner over the same span of time.

To insure that each of the communication devices 104-112 selects the same communication device as the floor owner, a common method for selecting a floor owner can be implemented on each of the communication devices 104-112. For example, each of the floor requests 114-118 can comprise a random symbol and, optionally, an indication of a priority level, and each of the communication devices 104-112 receiving the floor requests 114-118 can select the floor owner based on the various random symbols and priority level indications.

The random symbols each may be any symbol to which a value can be assigned. For instance, the random symbols can comprise a plurality of alphanumeric characters, or one or more digital values. In such an arrangement, each of the communication devices 104-112 can be configured to identify from among the random symbols the random symbol that best satisfies particular criteria. Such criteria can be a lowest value, a highest value, a value closest to an average value, a lowest value of a given priority level, a highest value of a given priority level, or any other criteria suitable for selecting a random symbol from among a plurality of random symbols and priority levels in a manner that may be maintained consistent among a plurality of communication devices.

In one arrangement, the random symbols can be selected from a particular range of symbols. The process of selecting a random symbol can be sufficiently random to minimize the risk of multiple floor requests 114-118 being transmitted with the same random symbol. The use of random symbols and an associated selection criteria can ensure that each communications device has an equal opportunity to generate the random symbol (priority level aside) which may be selected to grant floor ownership. The range of random symbols should be sufficiently large to insure a low risk of multiple floor requests 114-118 being transmitted with the same random symbol.

Priority levels can be associated with the random symbols and/or the communication devices 104-112 from which the floor requests 114-118 are received. In one arrangement, the priority levels can be indicated explicitly, for example with a priority level indicator. The explicit priority level indicators can be selected from a predetermined range of priority values. Such priority level indicators may be included in one or more of the floor requests 114-118 by default, or in response to a user input. For example, if an emergency button is activated on a communications device 104 generating the floor request 114, an explicit priority level indicator can be included in the floor request 114.

In another arrangement, the priority levels can be indicated implicitly. For example, an implicit priority level can be automatically associated with floor requests with one or more of the communication devices 104-112 from which the floor requests are received. For instance, a priority level can be identified based upon an attribute associated with a floor request 114 or an identifier associated with the communication device 104 from which the floor request was received. Such identifier can be a user name, a number or any other identifier that may be associated with a communication device 104-112.

By way of example, assume that the floor request 114 has a random symbol with a value of 10,020 and a priority level having a value of 2, the floor request 116 has a random symbol with a value of 8,965 and a priority level having a value of 1, and the floor request 118 has a random symbol with a value of 9,677 and a priority level having a value of 1. If each of the communication devices 104-112 are configured to identify the random symbol having the highest value with the highest priority, then each of the communication devices 104-112 can identify the symbol associated with the floor request 114. If, however, each of the communication devices 104-112 are configured to identify the random symbol having the highest value with the lowest priority, then each of the communication devices 104-112 can identify the symbol associated with the floor request 118. Accordingly, each of the communication devices 104-112 can grant floor ownership to the same communication device from which the identified symbol was received, for instance the communication device 104. The communication device 104 can retain floor ownership while continuing to transmit its data stream. In response to the data stream being terminated, the communication device's floor ownership can be terminated.

In one arrangement, having determined for itself that it now has floor ownership based on the comparison of its random symbol and priority level to the other random symbols and priority levels received from the communication devices 106-108, the communication device 104 can begin, or continue, communicating a data stream to the communication devices 106-112. Similarly, having determined for themselves that the communication device 104 is to be granted floor ownership, the communication devices 106-112 can receive and process the data stream from the communication device 104. For example, if the data stream contains media (e.g. audio and/or video data), such media can be presented to respective users of the communication devices 106-112.

In one aspect of the inventive arrangements, the floor requests 114-118 each can be communicated in a respective data stream that also comprises media intended for communication devices associated with the target resource. Advantageously, media contained in the respective data streams can be buffered so as to insure media is not lost while floor ownership is pending selection. For instance, each of the communication devices 104-112 that receives one or more data streams can buffer the respective media until a determination is made as to which of the communication devices 104-108 floor ownership is to be granted.

Figure 2:
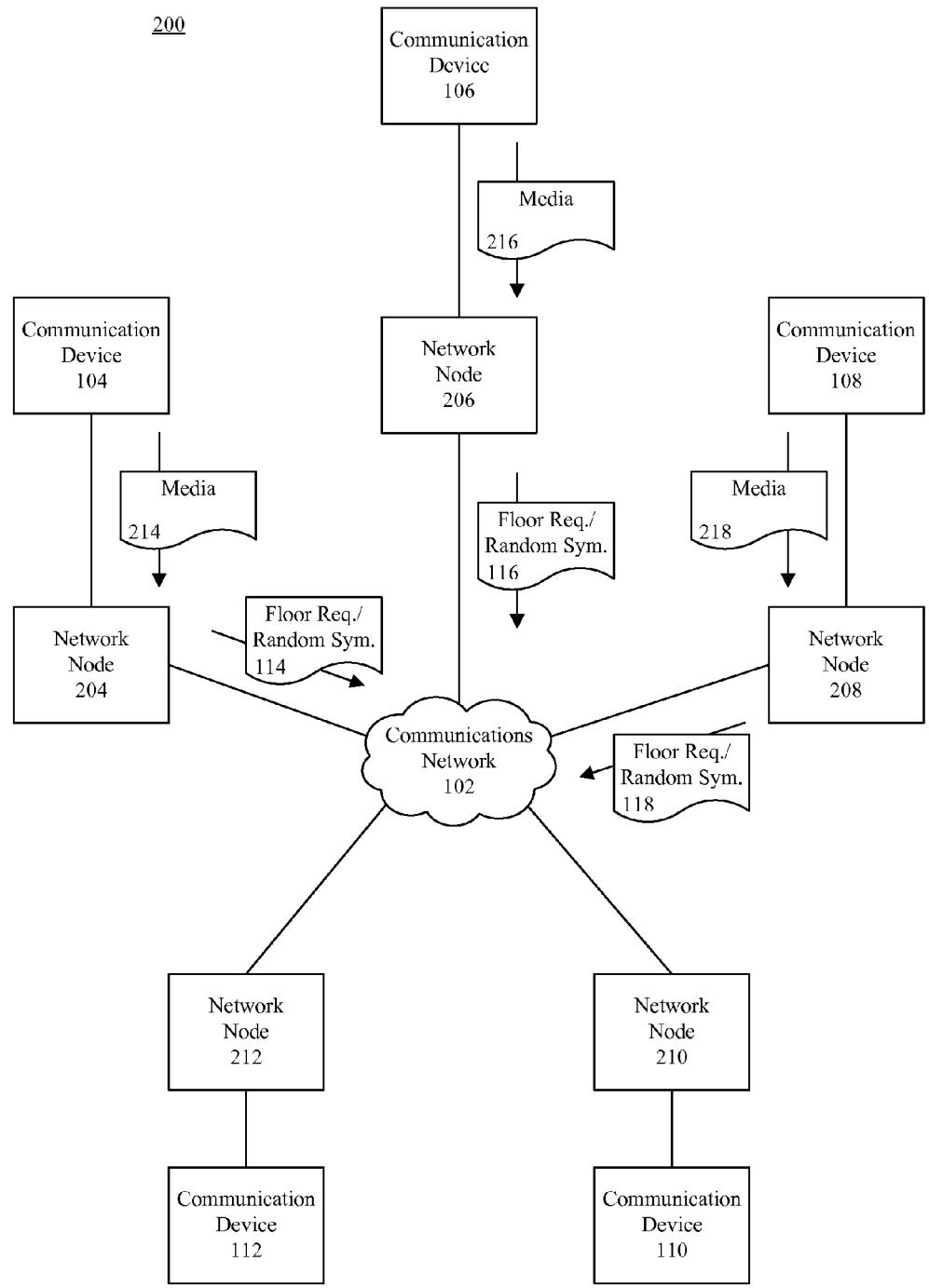
FIG. 2 depicts another communications system that is useful for understanding the present invention.

FIG. 2 depicts another communications system 200 that is useful for understanding the present invention. In lieu of the floor requests 114-118 being generated by the communication devices 104-108, the floor requests 114-118 can be generated by network nodes 204, 206, 208 to which the communication devices 104-108 are communicatively linked. As used herein, the term "network node" means a node of network infrastructure. The network nodes 204-208 can be, for example, base transceiver stations (BTSs), base repeaters (BRs), or base stations (BSs).

The network nodes 204-208 can generate the floor requests 114-118 in response to receiving media 214, 216, 218, respectively, from the communication devices 104-108. For example, the network node 204 can generate the floor request 114 in response to receiving from the communication device 104 a data stream containing media 214. Similarly, the network node 206 can generate the floor request 116 in response to receiving from the communication device 106 a data stream containing media 216, and the network node 208 can generate the floor request 118 in response to receiving from the communication device 108 a data stream containing media 218.

If multiple communication devices are communicatively linked to a particular network node 204-208 and such communication devices begin transmitting at approximately the same time, the network node 204-208 can generate a plurality of floor requests 114-118. For instance, one floor request 114-118 can be generated for each of such communication devices 104-108 that have begun transmitting.

As noted, the floor requests 114-118 may be explicitly communicated, wherein the floor requests are distinct from media 214-218 being communicated. Alternatively, the floor requests 114-118 may be implicitly communicated, wherein the floor requests are coupled to the media 214-218 prior to the media 214-218 being propagated to other infrastructure of the communications network 102.

In lieu of the floor requests 114-118 being processed by the communication devices 104-112, the floor request 114-118 can be processed by the respective network nodes 204, 206, 208, 210, 212 for the purpose of granting floor ownership. For example, each of the network nodes 204-212 can receive floor requests generated by other network nodes 204-212, and grant floor ownership to the communication device associated with an identified random symbol (e.g. the communication device for which the random symbol was generated) in accordance with the methods described herein.

Figure 3:
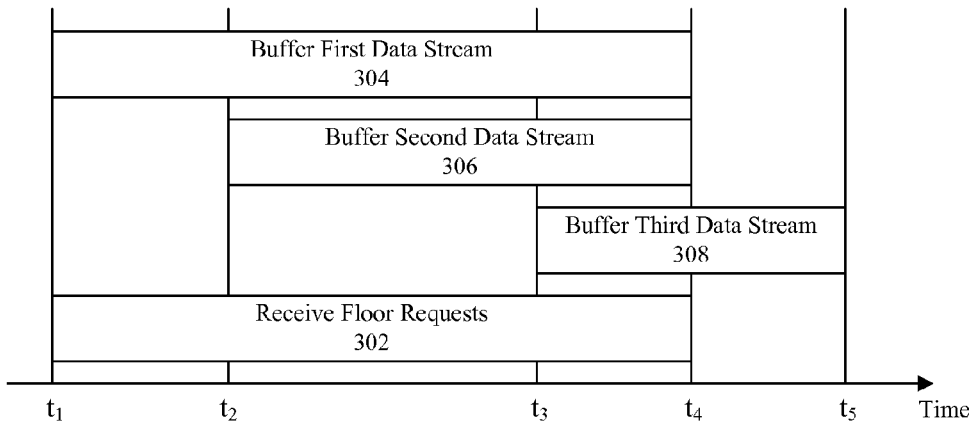
FIG. 3 depicts a buffer timing diagram that is useful for understanding the present invention.

FIG. 3 depicts a buffer timing diagram 300 depicting an example of buffer timing that may be implemented by one or more of the communication devices or network nodes to which the communication devices are communicatively linked. For simplicity, in FIG. 3 the device receiving floor requests (e.g. the communication device or the network node to which the communication device is communicatively linked) will be referred to as the "target communication device." The buffer timing diagram 300 can begin with the target communication device in a state in which a floor owner is not presently assigned. At time $t_1$ a first packet of a first data stream comprising a first floor request can be received from a first communication device. As noted, the floor request can include a random symbol. The floor request can be wholly contained within one packet of the first data stream, for instance within the first packet, or distributed among a plurality of packets within the first data stream.

In response to the first floor request, the target communication device can define a period 302 in which the target communication device may listen for additional floor requests, for example a period beginning at time $t_1$ and expiring at time $t_4$. At the expiration of the period 302 at time $t_4$, the target communication device can grant floor ownership to a requesting communication device, for instance in accordance with the processes previously discussed.

In one arrangement, the period 302 can be determined based on the maximum time delay anticipated for communications between two or more communication devices sharing the same logical communications channel. For instance, the period 302 can be defined to be two times the maximum anticipated delay. This can help to insure that the target communication device will receive, prior to the end of the period 302, floor requests from all other communication devices which transmitted their respective floor requests at roughly the same time as the first communication device.

The maximum anticipated delay can be a predefined value, or dynamically determined based on previous communications. For example, network time protocol or a global positioning system (GPS) clock can be used to determine the maximum length of time required to communicate data between devices in the communications system. If the communications system includes network infrastructure, such network infrastructure can also be used to determine such maximum length of time, for instance using a system clock.

The target communication device can buffer media contained in the first data stream for a period 304, which can be substantially equal to the period 302. Thus, should the first communication device be granted floor ownership, the media received during the period 304 can be preserved and presented to a user once the floor request is granted, although with a time delay approximately equal to the period 304. The amount of data storage to allocate to buffer the media from the first data stream can be determined based on the period 304 and the data rate of the first data stream.

Similarly, if a second data stream is received from a second communication device at time $t_2$, the target communication device can buffer media contained in the second data stream for a period 306, which can begin at time $t_2$ and end approximately at time $t_4$. Should the second communication device be granted floor ownership, the media received during the period 306 can be preserved and presented to the user once the floor request is granted. The amount of data storage to allocate to buffer the media from the second data stream can be determined based on the period 306 and the data rate of the second data stream.

If a third data stream is received from a third communication device at time $t_3$, the target communication device can buffer media contained in the third data stream for a period 308 which begins at time $t_3$. If the amount of time remaining from time $t_3$ to time $t_4$ is not adequate to meet minimum buffer size requirements, the communication device can buffer the media for a period 308, which can begin at time $t_3$ and end approximately at time $t_5$, thus extending beyond the time $t_4$ at which floor ownership is granted. Time $t_5$ can be selected based on the required minimum buffer size and the data rate of the third data stream. Thus, if the third communication device is granted floor ownership, the media may not be presented to the user immediately when the floor request is granted. Instead, presentation of the media can begin at time $t_5$.

Regardless of which communication device is granted floor ownership, when the floor ownership grant occurs, media received from communication devices that were not granted floor ownership can be purged. Accordingly, the amount of media stored in the data buffer can be minimized.

Figure 4:
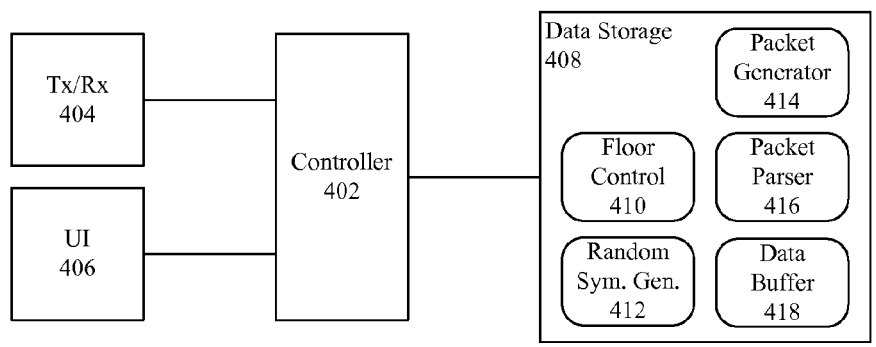
FIG. 4 depicts a block diagram of a communication device that is useful for understanding the present invention.

FIG. 4 depicts a block diagram of a communication device 400 that is useful for understanding the present invention. The communication device 400 can include a controller 402. The controller 402 can comprise, for example, one or more central processing units (CPUs), one or more digital signal processors (DSPs), one or more application specific integrated circuits (ASICs), one or more programmable logic devices (PLDs), a plurality of discrete components that can cooperate to process data, and/or any other suitable processing device. In an arrangement in which a plurality of such components are provided, the components can be coupled together to perform various processing functions as described herein.

The communication device 400 can also include a transceiver 404. The transceiver 404 can modulate and demodulate signals to convert signals from one form to another, and can transmit and/or receive such signals over one or more various wired or wireless communication networks. In illustration, the transceiver 404 can be configured to communicate data to and from other communication devices via IEEE 802 wireless communications, 3G, 4G, WPA, WPA2, GSM, TDMA, CDMA, WCDMA, OFDM, direct wireless communication, or any other communications format. Indeed, the transceiver 404 can communicate with other communication devices in accordance with any suitable communications standards and/or protocols, or a suitable combination of such standards and/or protocols.

The communication device 400 further can include a user interface 406. The user interface 406 can include one or more input devices suitable for receiving user inputs. Examples of such devices can include, but are not limited to, an input audio transducer (e.g. microphone), an audio processor, a still image camera, a video camera, buttons, keys, a touch screen, a touch pad, and the like. The user interface 406 can also include one or more output devices suitable for presenting media to a user. Such output devices can include, but are not limited to, an output audio transducer (e.g. loudspeaker), an audio processor, a display, an image processor (still and/or video), a haptic controller, etc. Further, additional devices can be components of the user interface 406, and the invention is not limited in this regard.

The communication device 400 can also include data storage 408. The data storage 408 can include one or more storage devices, each of which can include, but is not limited to, a magnetic storage medium, an electronic storage medium, an optical storage medium, a magneto-optical storage medium, and/or any other storage medium suitable for storing digital information. In one arrangement, the data storage 408 can be integrated into the controller 402, though this need not be the case.

A floor control application 410, random symbol generator 412, packet generator 414 and packet parser 416 can be contained on the data storage 408. One or more regions of the data storage 408 can also be used as a data buffer 418. The controller 402 can execute the floor control application 410 to implement the various methods and processes described herein. For example, when a user of the communication device 400 begins transmitting, the controller 402 can execute the floor control application 410 to generate a floor request. In addition, the controller 402 can execute the random symbol generator 412 to generate a random symbol, for example at the behest of the floor control application 410. In that regard, the random symbol can be passed to the floor control application 410, and the floor control application 410 can include the random symbol in the floor request along with an optional priority level.

Further, the controller 402 can execute the packet generator 414 to generate packets for the data stream. For example, the packet generator 414 can receive the floor request from the floor control application 410 and media from the user interface, and encode such data into the data stream. The packet generator can format the data stream in accordance with any suitable protocols and/or standards, and communicate the data stream to the transceiver 404 for communication to one or more communication devices associated with a target resource.

When the transceiver 404 of the communication device 400 receives multiple data streams from other communication devices, the controller 402 can execute the packet parser 416 to parse data from packets contained in the data streams. For example, the packet parser 416 can parse floor requests, including random symbols and priority levels, and media from such data streams. At the behest of the floor control application 410, the packet parser 416 can communicate the floor requests to the floor control application 410, and can communicate the media to the data buffer 418. The floor control application 410 can determine when to pass the media from the data buffer 418 to the user interface 406 for presentation to a user, when to purge media from the data buffer 418, when to store the media to a permanent storage location, or when to perform any other actions on the media.

The floor control application 410 can also process the random symbols and, optionally, priority levels associated with the floor requests to identify a random symbol and/or associated priority level that satisfies certain criteria. The priority levels can be explicit or implicit priority levels that are identified by the floor control application 410. If the communication device has generated its own random symbol/priority level, such random symbol/priority level can also be processed. The floor control application 410 then can select the communication device from which the identified random symbol was received, and grant floor ownership to such communication device, as previously described. Such communication device can be the communication device 400, or another communication device.

The communication device that is granted floor ownership can retain floor ownership while transmitting. In response to the data stream from the floor owner being terminated, the floor control application 410 can terminate that communication device's floor ownership.

Figure 5:
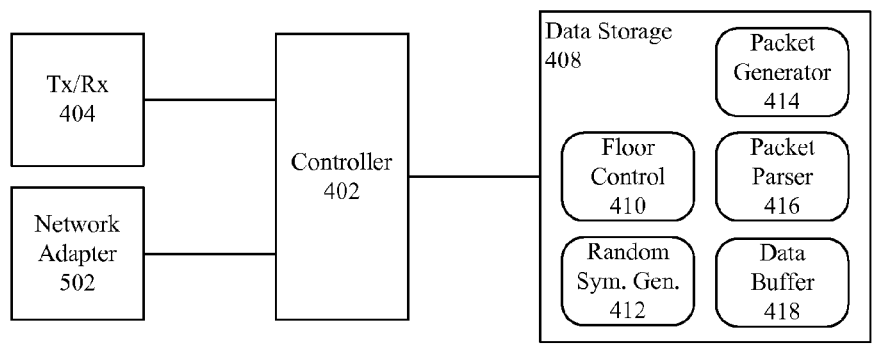
FIG. 5 depicts a block diagram of a network node that is useful for understanding the present invention.

FIG. 5 depicts a block diagram of a network node 500 that is useful for understanding the present invention. The network node 500 can be implemented in the communications system if one or more of the communication devices do not include the floor control application 410. In that regard, the network node 500 can include the controller 402, data storage 408, floor control application 410, random symbol generator 412, packet generator 414, packet parser 416 and data buffer 418 previously described. Of course, such components can be optimized for operation in the network node 500 rather than in a communication device.

The network node 500 can also include the transceiver 404, which may be used to communicate with one or more communication devices. For instance, the transceiver 404 may transmit data streams to the communication devices and receive data streams from such communication devices. The network node 500 can also include a network adapter 502 which the network node 500 may use to communicate via the communications network.

Via the transceiver 404, the network node 500 can receive a data stream generated by a first communication device. In response to such data stream, the floor control application 410 can generate a floor request comprising a random symbol. Via the network adapter 502, the floor control application 410 can communicate the floor request and the data stream to one or more other communication devices or network nodes. As noted, the floor request can be communicated explicitly or implicitly.

Via the network adapter 502, the network node can also receive data streams generated by one or more of the other communication devices or network nodes and, via the transceiver 404, communicate such data streams to the first communication device. As noted, the data streams received from the other communication devices or network nodes can contain the floor requests comprising random symbols. At the behest of the floor control application 410, the packet parser 416 can parse such floor requests and random symbols from the data streams and the floor control application 410 can process the random symbols to grant floor ownership, as previously described. The floor control application 410 can communicate the data stream of the floor owner to the first communication device, while data streams from other communication devices can be ignored or purged.

Figures 6, 7:
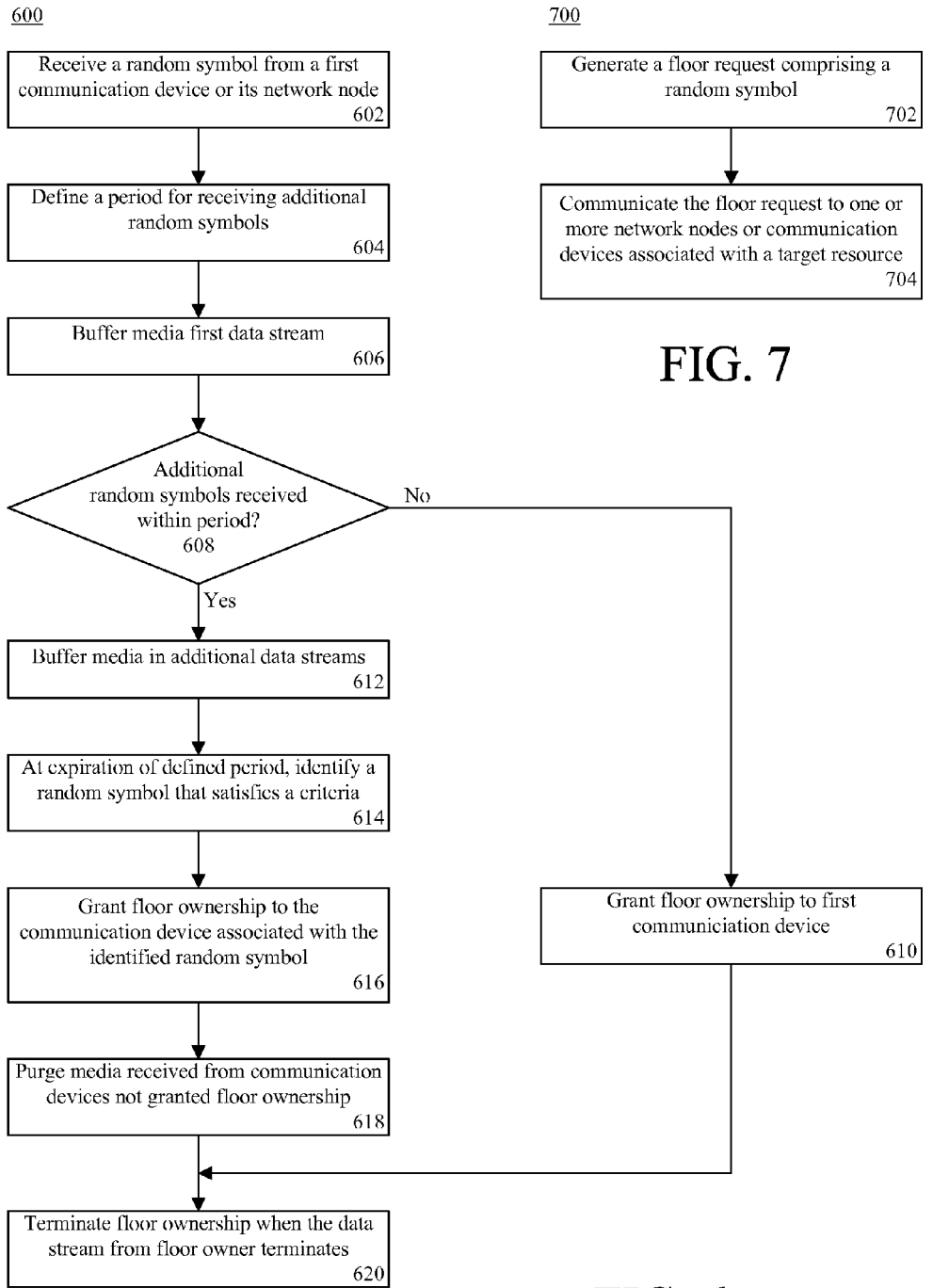
FIG. 6 is a flowchart presenting a method that is useful for understanding the present invention.
FIG. 7 is a flowchart presenting another method that is useful for understanding the present invention.

FIG. 6 is a flowchart presenting a method 600 that is useful for understanding the present invention. The method 600 can begin in a state in which a target communication device, or a network node to which the target communication device is communicatively linked, is configured to receive communications from a plurality of other communication devices, but none of the communication devices presently have floor ownership.

At step 602, the target communication device, or the network node to which the target communication device is communicatively linked, can receive a random symbol for a first communication device. Optionally, a priority level for the first communication device can also be received. As noted, the priority level can be explicit or implicit. The random symbol can be contained in a floor request communicated by, or on behalf of, the first communication device.

At step 604, a period can be defined for receiving additional random symbols from other communication devices. The period can be defined to begin when the random symbol is received. As previously noted, the defined period can be determined based on a maximum time delay anticipated for communications between at least two communication devices in the communications system.

At step 606, media in the first data stream can be buffered until expiration of the defined period. Referring to decision box 608, if additional random symbols are not received within the period, the process can continue to step 610 and floor ownership can be granted to the first communication device. If, however, additional random symbols are received within the period, the process can continue to step 612. At step 612, the media contained in the additional data streams can be buffered until expiration of the defined period.

At step 614, at the expiration of the defined period, a random symbol that satisfies a criteria can be identified. As noted, such criteria can be any criteria suitable for selecting a random symbol from among a plurality of random symbols in a manner that may be maintained consistent among multiple communication devices. Further, selection of the random symbol can be based, at least in part, on priority levels assigned to the various communication devices from which the random symbols were received. For example, priority levels associated with the random symbols can be identified and processed.

At step 616, floor ownership can be granted to the communication device associated with the identified random symbol. At step 618, media received in data streams from communication devices that were not granted floor ownership can be purged to reduce the amount of media in the data buffer. At step 620, floor ownership can be terminated when the data stream from the floor owner terminates.

FIG. 7 is a flowchart presenting another method 700 that is useful for understanding the present invention. The method 700 can begin in a state in which a communication device, or a network node to which the communication device is communicatively linked, is configured to send communications to one or more other communication devices or network nodes associated with a target resource, but no other communication device presently has floor ownership.

At step 702, the communication device, or the network node to which the communication device is communicatively linked, can generate a floor request comprising a random symbol. Optionally, the floor request can also include an explicit priority level, or an attribute or identifier from which an implicit priority level can be identified. At step 704, the floor request can be communicated to communication devices associated with the target resource, or to network nodes to which such communication devices are communicatively linked. The floor request can be communicated in a data stream, and the communication device can continue communicating the data stream.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with an application that, when being loaded and executed, controls the processing system such that it carries out the methods described herein. The present invention can also be embedded in a program storage device readable by a machine, tangibly embodying a program of instructions executable by the machine to perform methods and processes described herein. The present invention can also be embedded in an application product which comprises all the features enabling the implementation of the methods described herein and, which when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

This invention can be embodied in other forms without departing from the spirit or essential attributes thereof. Accordingly, reference should be made to the following claims, rather than to the foregoing specification, as indicating the scope of the invention.

What is claimed is:

1. A method of implementing floor control in a communications system, comprising:
   receiving a random symbol from each of a plurality of mobile stations, wherein the random symbol was generated via a random symbol generator within each of the plurality of mobile stations;
   receiving a priority from each of the plurality of mobile stations;
   from the plurality of random symbols, identifying a random symbol that satisfies a criteria; and
   identifying a priority level associated with the random symbol,
   in response to receiving the plurality of random symbols from the mobile stations and the identified priority, each of the plurality of mobile stations determining a floor owner from a selected one of the mobile stations from which the identified random symbol was received by implicitly determining the floor owner from the received random number.

2. The method of claim 1, wherein identifying the random symbol comprises identifying the random symbol after expiration of a time period.

3. The method of claim 1, wherein receiving the random symbols comprises receiving a respective data stream from each of the plurality of mobile stations, each respective data stream comprising a corresponding one of the random symbols and media.

4. The method of claim 1, further comprising:
   generating a floor request comprising a random symbol; and
   communicating the floor request to at least one of the plurality of mobile stations.

5. A mobile station, comprising:
   a transceiver that receives a random symbol from each of a plurality of other mobile stations, wherein the random symbol was generated via a random symbol generator within each of the plurality of other mobile stations, the transceiver additionally receiving a priority from each of the plurality of other mobile stations;
   a controller; and
   a floor control application, executed by the controller, that, from the plurality of random symbols, identifies a random symbol that satisfies a criteria, identifies a priority level, and in response to receiving the plurality of random symbols from the mobile stations and the identified priority, each of the plurality of mobile stations determines floor ownership from a selected one of the other mobile stations from which the identified random symbol was received by implicitly determining the floor owner from the received random number.

6. The mobile station of claim 5, wherein the floor control application identifies the random symbol after expiration of a time period.

7. The mobile station of claim 5, wherein the transceiver receives a respective data stream from each of the plurality of other mobile stations, each respective data streams comprising a corresponding one of the random symbols and media.

8. The mobile station of claim 5, wherein:
the transceiver receives a data stream communicated from the selected mobile station; and
responsive to communication of the data stream being terminated, the floor control application terminates the floor ownership granted to the selected mobile station.

9. A network node, comprising:
a network adapter that receives a priority and a random symbol from each of a plurality of other network nodes, wherein the random symbol was generated via a random symbol generator within each of the plurality of other network nodes;
a controller; and
a floor control application, executed by the controller, that, from the plurality of random symbols, identifies a random symbol that satisfies a criteria, and in response to receiving the plurality of random symbols from the mobile stations and the identified priority, each of the plurality of mobile stations determining a floor owner from a selected one of the mobile stations from which the identified random symbol was received by implicitly determining the floor owner from the received random number.

10. The network node of claim 9, wherein the floor control application identifies the random symbol after expiration of a time period.

11. The network node of claim 9, wherein the network adapter receives a respective data stream from each of the plurality of other network nodes, each respective data streams comprising a corresponding one of the random symbols and media.

12. The mobile station of claim 9, further comprising:
a transceiver that receives a data stream from a mobile station;
wherein:
the floor control application generates a floor request comprising a random symbol; and
the network adapter communicates the floor request to at least one of the other network nodes.

13. The method of claim 1 further comprising the steps of:
receiving data from one of the plurality of mobile stations;
buffering the data prior to the step of granting floor ownership.

14. The mobile station of claim 5 further comprising:
a buffer buffering the data from a mobile station prior to granting floor ownership.

15. The network node of claim 9 further comprising:
a buffer buffering the data from a mobile station prior to granting floor ownership.

\* \* \* \* \*